United States Patent

[11] 3,624,676

| [72] | Inventors | Charles A. Whitney<br>Canton;<br>Walter J. Hutengs, Plainville, both of Conn. |
|---|---|---|
| [21] | Appl. No. | 835,043 |
| [22] | Filed | June 20, 1969 |
| [45] | Patented | Nov. 30, 1971 |
| [73] | Assignee | The Superior Electric Company<br>Bristol, Conn. |

[54] NUMERICALLY CONTROLLED WIRE TERMINATING APPARATUS
3 Claims, 5 Drawing Figs.

[52] U.S. Cl..................................... 29/203 B, 29/407
[51] Int. Cl..................................... H01r 43/00
[50] Field of Search.......................... 29/203 MW, 203 B, 203, 407

[56] References Cited
UNITED STATES PATENTS

| 3,440,531 | 4/1969 | Jasorka et al................ | 29/407 X |
| 3,479,720 | 11/1969 | Bohannon et al............ | 29/203 B |

*Primary Examiner*—Donald R. Schran
*Attorney*—Johnson and Kline

ABSTRACT: An apparatus for automatically positioning work held on a support with respect to a tool according to programmed commands effectuated by a numerical control system. The tool performs an operation on the work which requires an operator to manually select a specific size workpiece for each operation from a plurality of different sizes. The apparatus includes an operator sensible indicator for each specific size workpiece and the system through programmed commands causes the indicator for the immediately required size of workpiece to be energized to inform the operator which workpiece must be selected.

INVENTORS
Charles A. Whitney
Walter J. Hutengs

BY Johnsonand Kline
ATTORNEYS

NUMERICALLY CONTROLLED WIRE TERMINATING APPARATUS

In performing many operations utilizing numerically controlled machinery, the complete operation is capable of being programmed which eliminates requiring an operator's attention or service while the operation is being performed. However, in some instances, part of the operation may be automatically controlled but yet part may also require an operator to perform a manual act. One manual act may be the selecting of a specific workpiece from a plurality of different size workpieces, and the operator could obtain the information as to which workpiece to select by consulting written instructions. Normally, there is a plurality of operations performed on the work, and for each operation, the operator is required to consult the written information and correlate it with the automatic machinery operation. Should the operator become confused or mistaken, the wrong workpiece could be selected which would not only render the immediate operation unsatisfactory but could render the whole work unacceptable. Additionally, the time for the operator to select the workpiece may be longer than the time needed by the automatic machinery to carry out its instructions, thereby preventing full utilization of the machinery.

It is accordingly an object of the present invention to provide a numerically controlled apparatus which automatically provides to an operator a sensible indication of which workpiece to select for each operation from a plurality of different workpieces.

Another object of the present invention is to achieve the above object with a numerically controlled system which requires only slight addition in heretofore known systems and which is relatively economical and durable in use.

A further object of the present invention is to provide a numerically controlled wire-wrapping machine that has programmed commands which both automatically positions the work with respect to a tool and which automatically indicates to an operator which workpiece to select from a plurality of workpieces for the particular position of the work.

In carrying out the present invention, the specific embodiment thereof herein described is a wire-wrapping machine which has a table on which work, specifically a connector having pins is mounted. The table is supported for movement in a plane and a fixed, though vertically movable wire-wrapping tool is supported above the table. The work is automatically moved and positioned with respect to the tool by a numerical control system such as is shown in U.S. Pat. application Ser. No. 447,133, filed Aug. 4, 1965, now U.S. Pat. No. 3,466,515, dated Sept. 9, 1969, and assigned to the assignee of the present invention, which moves the table incrementally along X- and Y-axes.

It is desired to electrically connect two terminals or pins by a wire with one end of the wire being connected to one terminal and the other end to the other terminal. Thus, one end of the wire is inserted into the tool, the table positioned to have the one pin vertically in alignment with the tool, the operator manually vertically moves the tool into engagement with the pin and effects the connection by wrapping the wire end around the pin. The table is then repositioned automatically to have the other pin in alignment with the tool, the other end of the wire is inserted into the tool and then manually moved to effect the connection. As the wire is normally insulated, both ends are stripped of insulation to effectuate the connection. Moreover, the distance between the two connected pins, either straight line or orthogonally, determines the approximate length of the wire. Thus, for every connection between pairs of pins, the length of wire required must be selected by the operator and used for that connection.

In accordance with the present invention, there is provided a plurality of different lengths of wire with each wire of the same length being disposed in its own separate compartment and with the plurality of compartments being located adjacent the operator. Each compartment has an operator sensible means, specifically an indicating light associated therewith. The programmed instructions to the system includes a command of which length of wire is to be used and the system, following the command, effects energization of the light associated with that length's compartment. Thus, as the work is positioned with respect to the tool in carrying out one command, one light will be energized and provide to the operator a visual signal that indicates the compartment from which the length of wire is to be taken to perform the immediate operation.

Other features and advantages will hereinafter appear.

Figure 1:
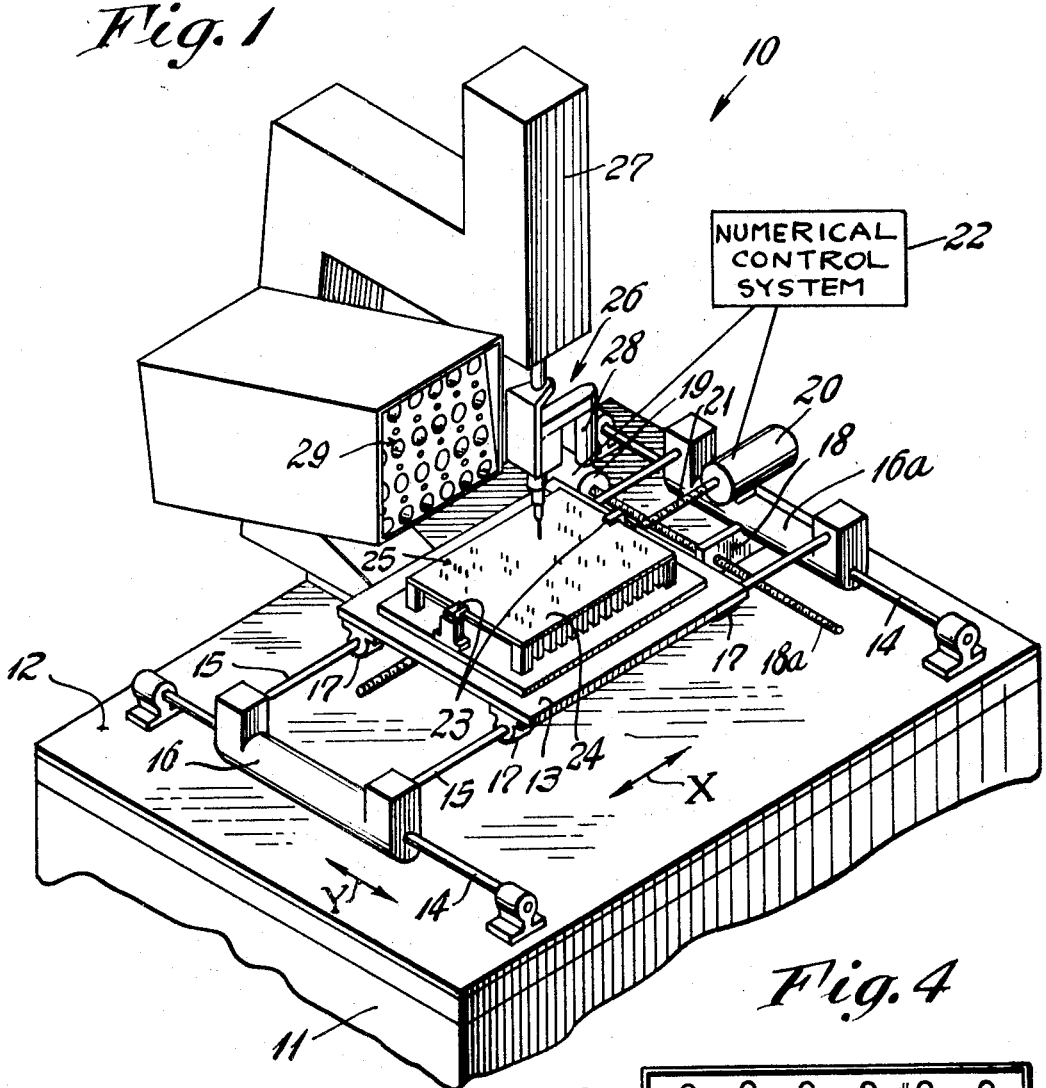
FIG. 1 is a perspective view of the numerically controlled wire-terminating apparatus of the present invention.

Referring to the drawings, the numerically controlled wire-terminating machine is generally indicated by the reference numeral 10 and includes a base 11 having a flat surface 12. A worktable 13 is mounted on the support 12 for movement along the Y-axis by the use of a pair of spaced, extending shafts 14 and for movement along the X-axis by spaced shafts 15. The ends of the shafts 15 are supported in linear bushings 16 and 16a through which the shafts 14 pass while the table 13 includes linear bushings 17 through which the shafts 15 pass. The bushing 16a carries a threaded nut 17 that cooperates with a screw 18 driven by a motor 19 to effect positioning of the table 13 along the Y-axis shafts upon rotation thereof. Additionally, a motor 20 mounted on the bushing 16a drives a threaded rod 21 that cooperates with a threaded nut (not shown) carried by the table 13 to control movement along the X-axis shafts 15. As indicated, the energization of the motors 20 and 19 is controlled by a numerically controlled system generally indicated by the reference numeral 22. One specific system which may be employed is disclosed in the above-noted U.S. patent.

The table 13 carries clamps 23 which clamp work 24 such as a printed circuit board connector, to the table with the connector having a plurality of vertically extending terminals or pins 25 located at precise positions thereon. Positioned vertically above the table 13 on an overhanging arm 27 is a wire-wrapping tool 26 and it is supported for just vertical movement toward and away from the table 13. Specifically, a handle 28 is utilized by the operator to manually move the tool 26 towards the work to perform a wire-wrapping function. The tool 26 while herein described as being a wire-wrapping tool may be of any conventional construction and also rather than being wire wrapping may be of other electrical and mechanical wire-connecting types. The handle 28 may also include a trigger for effecting rotation of the tool as is well known in the art.

The numerical control system 22 functions to control the energization of the motors 19 and 20 to position a selected pin 25 beneath the tool 26. An operator connects one end of a wire to the selected pin that is aligned with the tool by inserting the wire end into the tool 26, vertically moving the tool 26 to engage the pin and then causing the tool to rotate and wrap the wire end about the pin. The tool is then moved upward, and the system 22 repositions the table so that the pin to which the other end of the wire is to be connected will be vertically aligned to the tool at which time the operator repeats the wire-terminating operation.

It will be understood that the wire selected is required to be of a length which is as long as is required to extend, either straight line or orthogonally, from one pin to the other and in addition should not be so long as to have created excessive surplusage in its length. Moreover, for each wire that is connected between two pins, a length of wire coming within the above limitations should be selected.

In accordance with the present invention, there is provided adjacent the tool 26, a plurality of compartments generally indicated by the number 29. Each compartment consists of an open-ended cylindrical tube into which a plurality of lengths of the same size wire may be inserted, contained and separately removed. There are 24 separate compartments shown and thus any one of 24 different sizes or kinds of wire lengths may be selected. In order to provide to the operator an indication of which compartment from which to select the wire length necessary for the immediate position of the work 24, each compartment is provided with a light 30 located immediately thereabove.

Thus, an operator sitting at the machine 10 is in a position to operate the tool 26, has the pin 25 to which a wire end is to be connected located automatically beneath the tool and also is given a sensible indication of the compartment from which the wire is to be selected for that position of the work. The numerical control system 22 provides the automatic positioning of the work 24 and also the indication of the compartment based on information supplied by programmed instructions and, accordingly, removes from the operator's discretion, the determination of the wire to be selected and the pin to which a wire is to be attached.

Figure 5:
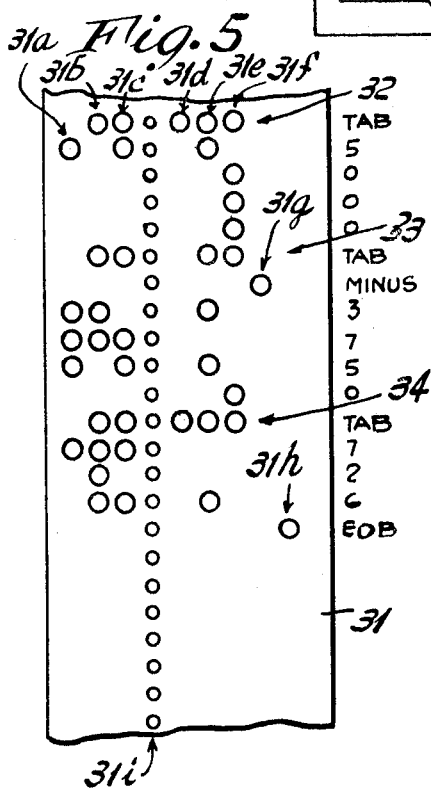
FIG. 5 is a length of tape having programmed instructions which may be employed in the present machine.

The numerical control system 22 as disclosed in the above-noted application utilizes a length of tape such as shown in FIG. 5 but it will be understood that other and different structure for supplying programmed instructions to the system 22 may be employed if desired. As to the tape 31, it is of standard shape having eight longitudinal tracks denoted 31a–31h in each of which a hole may be punched in transverse alignment with drive sprocket holes 31i. With the particular tape shown and using a code explained in the above-noted application, the first transverse row of holes denoted 32 constitutes a tab, (as indicated by the word written horizontally aligned therewith) while the next three rows denote a unit of 5,000. A second tab 33 is followed by rows which denote a unit of −3,750. This is followed by a third tab 34. The information of 5,000 and −3,750 indicates that the work is to be moved from its last position 5,000 steps (with each step being 0.001 -inch for example) in the X direction, leftwardly, and −3,750 steps on the Y-axis towards the operator. Using this information, the motors 19 and 20 will effect the positioning of the desired pin beneath the tool 26.

The information following the third tab 34, namely, 726 is a code which indicates which light 30 is to be energized to inform the operator of the compartment from which a length of wire is to be selected for this particular position of the table. For each position of the work 25 a programmed command must be provided while for every other position instruction there is provided a tab such as tab 34 followed by a code number which provides a sensible indication for the operator to effect selection of the correct length of wire. It will be understood that the reason why only every other position of the table requires a wire selection command is because the operator, having connected one end of the selected wire for one position connects the other end for the next position. It is however, contemplated, that in other machines wherein a workpiece is to be used for each work position, that the instructions will include information for effecting the providing of a visual indication for each position.

Figure 2:
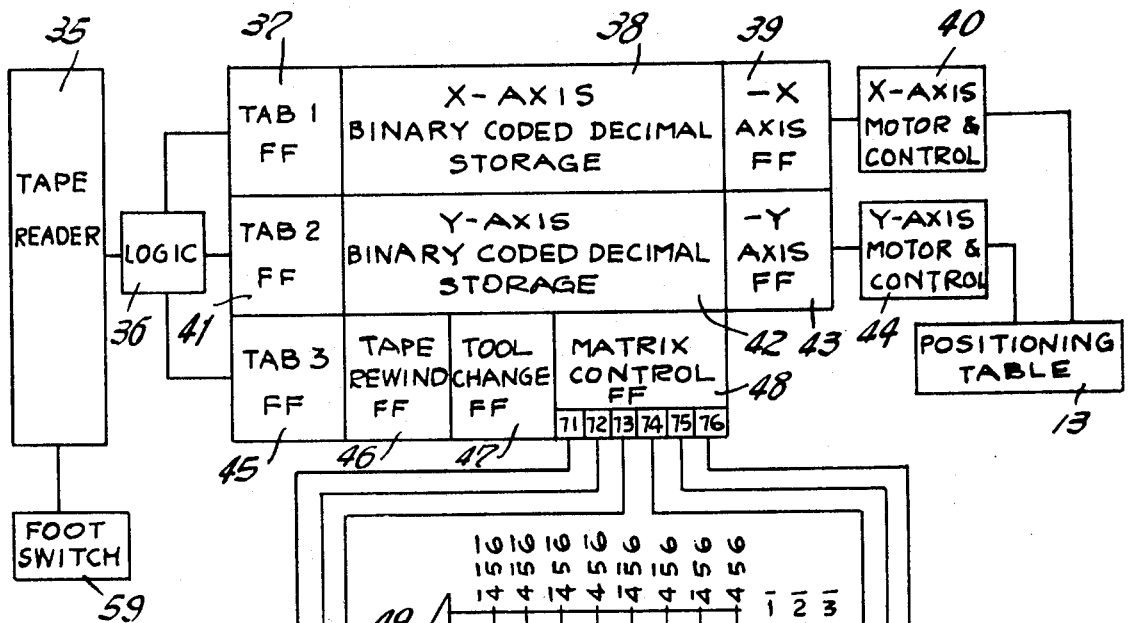
FIG. 2 is a block and diagrammatic representation of the numerical control system.

Referring to FIG. 2, the numerical control system includes a punched tape reader 35 which, through a logic circuit 36 supplies the coded information through a tab 1 flip-flop 37 to an X-axis binary coded decimal storage 38 and through a directional control flip-flop 39 to the X-axis motor and control 40. Similarly, the information following tab 2 is directed through a tab 2 flip-flop 41 to a Y-axis binary coded decimal storage 42, directional control flip-flop 43, and a Y-axis motor and control 44. The motor and controls 40 and 44 include the motors 20 and 19, respectively, and are shown diagrammatically connected to the table 13.

The information following tab 3 which in the system is generally referred to as miscellaneous functions is directed through a tab 3 flip-flop 45 to either a tape rewind flip-flop 46; a tool change flip-flop 47 or a matrix control 48 or to other miscellaneous command flip-flops (not shown). Except for the matrix control 48, the above-noted numerical control system is more specifically disclosed in the above-noted patent.

The matrix control 48 consists of six flip-flops denoted 71–76. The information following the tab 3, if the first letter is a 7 is caused by the logic system 36 to be directed to the matrix control flip-flops and to energize each flip-flop whose unit member following the 7 is coded on the tape. Thus, with the information given in the tape shown in FIG. 5, the flip-flop 72 will be energized and also the flip-flop 76.

The provision of two sets of three flip-flops in the matrix control 48 enables the system to have the ability to select for an indication any one of 64 different lights 30. The flip-flop set 71, 72 and 73 are connected to a PNP-transistor tree 49 while the remaining flip-flops are connected to NPN-transistor tree 50. The output of the tree 49 consists of eight wires which are denoted $\overline{123}$; $1\overline{23}$; $\overline{1}2\overline{3}$ etc., to 123. For each combination of energization of the flip-flops 71, 72 and 73, only one output wire will be selected for energization. Thus, for example, output $\overline{123}$ will be energized if not one of the flip-flops 71, 72 and 73 are energized while output 123 will be energized if all three flip-flops are energized. Similarly, the NPN-transistor tree 50 has eight outputs indicated by $\overline{456}$ $4\overline{56}$, etc., to 456 and one of these outputs will be energized depending upon the energization of the flip-flops 74, 75 and 76. Accordingly, there will be one wire from the PNP-tree energized and one wire from the NPN-tree energized and in the specific embodiment of the coded tape 726 these outputs are $1\overline{23}$ and $\overline{456}$. The outputs of the two trees are depicted as being interconnected by their extending at right angles to each other. Each junction or crossover while not an actual electrical connection, is capable of enabling the selection of light 30 but requires for that junction that both the output of the tree 49 and the output of the tree 50 that form the junction be energized.

Figure 3:
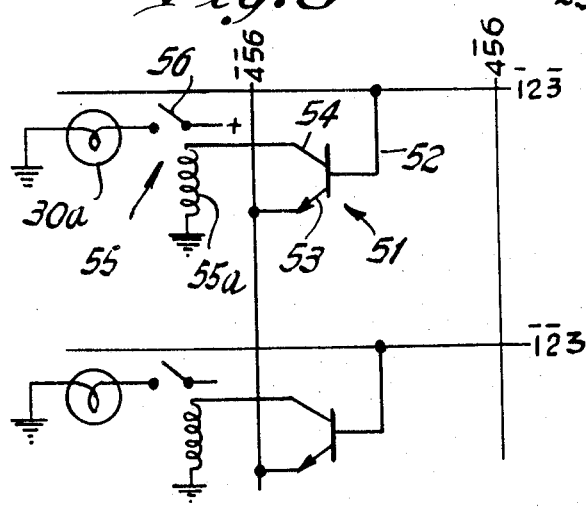
FIG. 3 is a schematic diagram of a pair of lamp energizing circuits.

Referring specifically to FIG. 3, there is shown a schematic diagram of two of the lights 30 and their energizing circuits together with some of the output wires of the trees 49 and 50, it being understood that each junction will have such a light circuit. The output of the PNP-tree 49 that is determined by the flip-flops 71, 72 and 73 will be energized positively while the output energized by the NPN-tree 50 will be energized negatively. Connected to these outputs $1\overline{23}$ and $\overline{456}$ is a transistor 51 with its base 52 connected to the output $1\overline{23}$ and its emitter 53 connected to the output $\overline{456}$. The collector 54 of the transistor is in series with a coil 55a of a relay 55 having a normally open, contact arm 56. The incandescent light 30a to be energized is connected in series with the switch arm 56 across a source of unidirectional electrical energy as shown. Accordingly, with the output $1\overline{23}$ energized positive and the output $\overline{456}$ energized negative, the transistor 51 will be rendered conducting, energizing the relay 55 to effect illumination of the bulb 30a for as long as the matrix control 48 maintains the flip-flop energized. It will be understood that the use of trees 49 and 50 permit 64 possible selections and that each selection will include a circuit composed of the transistor 51, relay 55 and a light. However, only the transistor which has its base connected to a positively energized output from the tree 49 and its emitter to the negatively energized output from the tree 50 is capable of energizing its relay to have its associated light become energized.

Figure 4:
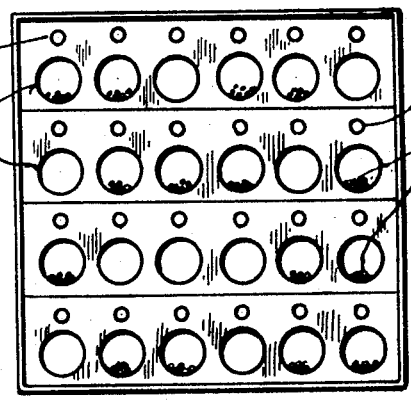
FIG. 4 is a front view of the compartment containing the lengths of wire and associated lights.

Shown in FIG. 4 is a front view of the compartments 27. Each compartment is adapted to hold a plurality of wires 57 so that each compartment holds a different wire which may be a difference as to wire size, length, color, etc. Above each compartment is a lamp 30. An operator accordingly, by just a glance at the compartments, can quickly determine which wire to select by noticing the energized lamp above the compartment holding the desired kind of wire. Preferably, the compartments are mounted in a box 57 having a front plate 58 with the open ends of the compartments somewhat flush with the panel. The lights 30 are also mounted on the panel with each in close proximity to its associated compartment.

After the operator has performed an operation, a switch such as a foot switch 59 is manually actuated to have the tape reader read the next block of instructions. The actuation of the switch will also cause clearing of the matrix control and other portions of the numerical control system to render it receptive to subsequent commands.

Though 24 compartments have been shown the number may vary as desired up to the maximum of 64 set by the specifically described matrix control. If necessary, the number may be increased by increasing the number of flip-flops in the matrix control 48 and a corresponding increase in the number of inputs and outputs of the trees 49 and 50.

It will accordingly be appreciated that there has been disclosed a numerically controlled machine which not only automatically positions work with respect to a tool but also provides a visually indication to an operator of the workpiece to select for performing an operation on the work. A plurality of different kinds of workpieces are supplied, each kind in its own compartment and a light is located at each compartment. The programmed instructions to the numerical control system includes both the required position of the work with respect to the tool and also the command of from which compartment a workpiece is to be selected. The operator, by glancing at the lights over the compartment can easily visually determine which light is energized in accordance with the instructions and then by removing a workpiece from said compartment, have the proper workpiece for the immediate position of the work.

Variations and modifications may be made within the scope of the invention and portions of the improvements may be used without others.

We claim:

1. A numerical controlled machine comprising a work-supporting means mounted for movement along two axes and adapted to hold work having a plurality of upstanding terminals, numerical control system for moving the work-supporting means in accordance with programmed instructions independently along the two axes and for positioning any desired terminal at a stationary work station, tool means mounted at the stationary work station for linear movement only toward and away from said work-supporting means and including a wire-wrapping tool for connecting one end of a wire to the terminal positioned at the work station with the wire being any one of a plurality of different kinds of wire, manually operable means for causing upon initial operation of said system to position a start terminal at the work station to which the start end of the wire is to be connected and for causing upon the next operation the positioning of an end terminal at the work station to which the end of the wire is to be connected, second manually operable means for effecting operation of the tool means to achieve each wire end connection with said connections being effected after each operation of the manually operable means, holding means for holding a plurality of different kinds of wire with each different kind of wire having a separate compartment, a visually sensible means associated with each compartment and having a normal nonindicating state and an indicating state, shifting means for controlling the shifting of each sensible means to its indicating state and means in the numerical control system interconnected with the shifting means for causing the shifting means to effect the indicating state for the one visually sensible means that is in accordance with the programmed instructions to provide a visual indication to an operator of the compartment from which to select the one wire simultaneously with the positioning of each start terminal at the work station.

2. The invention as defined in claim 1 in which the numerical control system includes a matrix control having a plurality of two state means, means for altering the states of the two state means in accordance with the programmed instructions and actuating means responsive to the states of the two state means for actuating the shifting means to shift the state of the one visually sensible means that corresponds to the programmed instructions and in which the actuating means includes a first and a second binary tree having inputs connected to the two state means and having a plurality of outputs, said trees causing each different combination of states of the two state means to energize a different output.

3. The invention as defined in claim 2 in which there is a shifting means connected with each output and in which only the shifting means connected to the energized output effects shifting of the visually sensible means associated therewith.

* * * * *

UNITED STATES PATENT OFFICE
CERTIFICATE OF CORRECTION

Patent No. 3,624,676          Dated November 30, 1971

Inventor(s) Charles A. Whitney and Walter J. Hutengs

It is certified that error appears in the above-identified patent and that said Letters Patent are hereby corrected as shown below:

Column 1, line 47, Serial No. 447,133 should read --477,133--.

Column 4, line 10, "member" should be --number--.

Signed and sealed this 27th day of June 1972.

(SEAL)
Attest:

EDWARD M. FLETCHER, JR.
Attesting Officer

ROBERT GOTTSCHALK
Commissioner of Patents